United States Patent [19]
Allford

[11] Patent Number: 6,060,678
[45] Date of Patent: May 9, 2000

[54] GAS SHIELD STRIP CLAD WELDING SYSTEM

[75] Inventor: Daniel Allford, Houston, Tex.

[73] Assignee: ARC Specialties, Houston, Tex.

[21] Appl. No.: 09/128,266

[22] Filed: Aug. 3, 1998

[51] Int. Cl.⁷ ................................................. B23K 9/00
[52] U.S. Cl. .................... 219/60 R; 219/59.1; 219/61; 219/60 A; 219/61.1; 219/66
[58] Field of Search .................. 219/60 R, 59.1, 219/61, 60 A, 61.1, 66

[56] References Cited

U.S. PATENT DOCUMENTS

| | | |
|---|---|---|
| 3,272,961 | 9/1966 | Maier, Jr. . |
| 3,274,371 | 9/1966 | Manz et al. . |
| 3,611,541 | 10/1971 | Garrett . |
| 3,794,804 | 2/1974 | Berghof ................................. 219/137 |
| 4,025,034 | 5/1977 | Randolph et al. ...................... 228/41 |
| 4,035,602 | 7/1977 | Berghof ................................... 219/72 |
| 4,149,060 | 4/1979 | Barger . |
| 4,237,362 | 12/1980 | Arnoldy . |
| 4,243,727 | 1/1981 | Wisler . |
| 4,518,625 | 5/1985 | Westfall . |
| 4,593,849 | 6/1986 | Doering ................................... 228/29 |
| 4,647,749 | 3/1987 | Koshy . |
| 4,850,524 | 7/1989 | Schick .................................... 228/102 |
| 5,025,126 | 6/1991 | Hansen ................................ 219/125.1 |
| 5,134,268 | 7/1992 | Capitanescu . |

*Primary Examiner*—Patrick Ryan
*Assistant Examiner*—M. Alexandra Elve
*Attorney, Agent, or Firm*—Harrison & Egbert

[57] ABSTRACT

A gas shield strip cladding welding system including a workpiece, a strip of welding material, an enclosure having an opening through which the strip of welding material passes, a feeder for controllably passing the strip of welding material into the enclosure through the opening, a gas delivery conduit connected to the enclosure so as to pass a shielding gas into the enclosure adjacent to the strip of material, and a power supply electrically connected to the strip of welding material and to the workpiece such that an arc is produced when the strip of welding material comes into close proximity to the workpiece. A mechanism is connected to the enclosure so as to move the enclosure continuously relative to the workpiece so as to deposit the welding material in a desired pattern. The shield gas includes an inert gas. The gas delivery conduit includes a first gas line connected to the enclosure so as to deliver the shield gas to one side of the strip of material and a second gas line connected to the enclosure so as to deliver the shield gas to an opposite side of the strip of material.

12 Claims, 2 Drawing Sheets

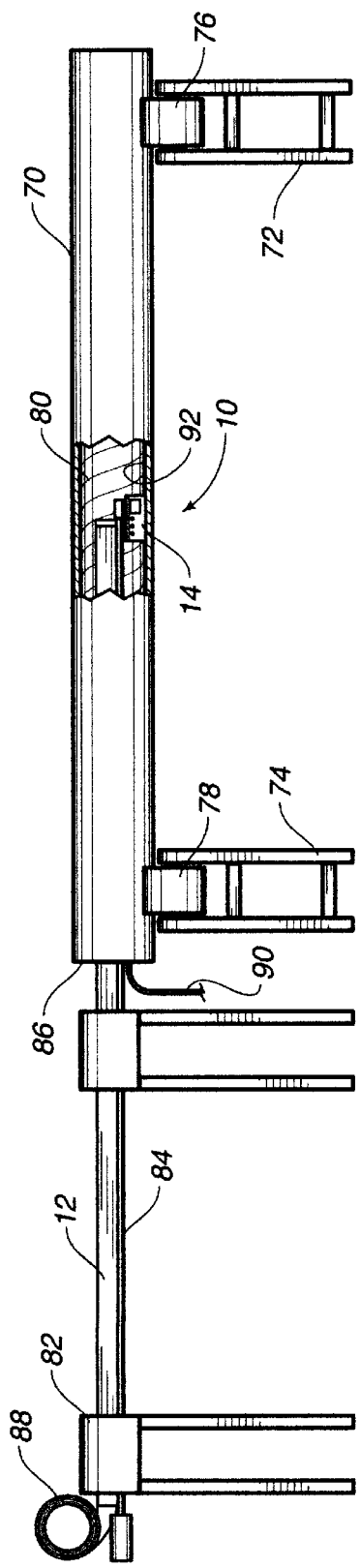
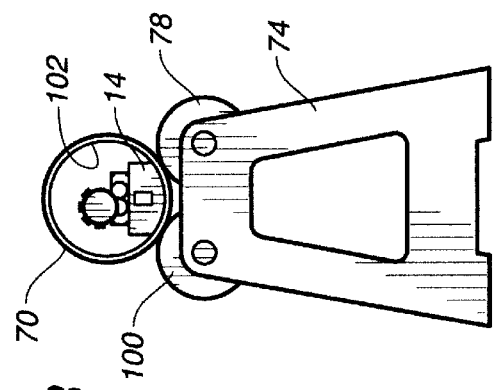

GAS SHIELD STRIP CLAD WELDING SYSTEM

TECHNICAL FIELD

The present invention relates generally to clad welding systems. More particularly, the present invention relates to such clad welding systems in which strips of welding material are used for the cladding of a base material. More particularly, the present invention relates to such systems which use the shielding of the arc.

BACKGROUND ART

In the manufacture of equipment used in the oilfield, it is often desirable to apply a coating to steel material so as to prevent corrosion of the material. Under many circumstances, these components are used in a highly corrosive hydrogen sulfide environment in which the material used for the formation of pipes and valves is easily corroded. Whenever hydrogen interacts with such components, there is the danger of hydrogen embrittlement which can cause a catastrophic failure of the system. Additionally, there are also a wide range of other corrosive chemicals which can damage such components.

This is particularly the case in many oil and gas pipelines. When such piping is used, the interior of the piping is commonly exposed to such highly corrosive items. As such, there has been a critical need so as to coat the interior of such pipes with a corrosion preventive material. Conventionally, when such pipes are used in a hydrogen sulfide environment, it is required that INCONEL (TM) material be used for the pipes. This INCONEL (TM) material is a chromium and nickel alloy. Through the use of such a chromium and nickel alloy, the pipe is resistive to hydrogen embrittlement. Unfortunately, such INCONEL (TM) material is extremely expensive. However, it is often the case that the value of the product from such hydrogen sulfide environments justifies the high cost of such INCONEL (TM) pipes.

Preferably, it would be desirable to coat or clad the interior contact surfaces of such conventional pipes with the INCONEL (TM) material. The critical contact surfaces of the pipe would be suitably coated with the chromium and nickel alloy while the remainder of the pipe would be formed of conventional steel material. This would significantly reduce the cost of such pipes. Unfortunately, prior to the present invention, no efficient process existed which would create a metallurgical bond between the chromium and nickel material and the inner surface of the pipe.

Typically, the cladding of a welding material to a surface of a workpiece has been accomplished by using submerged arc welding or electroslag welding with strip electrodes. The term "cladding" implies that a layer of material is applied by welding to the surface of a piece of metal, rather than the joining of two pieces together. Cladding is used for building up surfaces with similar materials or for applying a dissimilar layer. To increase the material disposition rate, traditional round wire filler materials are replaced with flat strips, which allow wide areas to be overlaid more efficiently. This strip welding is done using a flux to protect the arc and is simply a variation of submerged arc or electroslag welding. Strip welding using flux is easily applied to large parts where the spent flux, called slag, may be removed between welds. The necessity of slag removal between welds precludes the use of traditional strip overlay in confined areas.

Submerged arc welding produces a coalescence of metals by heating them with an arc between a bare metal electrode and the workpiece. The arc and molten metal are "submerged" in a blanket of granular fusible flux on the workpiece. Pressure is not used, and filler material is obtained from the electrode and sometimes from a supplemental source such as a welding rod or metal granules. In submerged arc welding, the arc is covered by a flux. This flux plays a main role in that (1) the stability of the arc is dependent on the flux, (2) mechanical and chemical properties of the final weld deposit can be controlled by flux, and (3) the quality of the weld may be affected by the care and handling of the flux. Submerged arc welding is a versatile production welding process capable of making welds with currents up to 2,000 amperes, AC or DC, using single or multiple wires of filler material.

In submerged arc welding, the end of a continuous bare wire electrode is inserted into a mound of flux that covers the area or joint to be welded. An arc is then initiated. A wire-feeding mechanism then begins to feed the electrode wire toward the joint at a controlled rate, and the feeder is moved manually or automatically along the weld seam. Additional flux is continually fed in front of and around the electrode and continuously distributed over the joint. Heat produced by the electric arc progressively melts some of the flux, the end of the wire, and the adjacent edges of the base metal so as to create a pool of molten metal beneath a layer of liquid slag. The melted bath near the arc is in a highly turbulent state. Gas bubbles are quickly swept to the surface of the pool. The flux floats on the molten metal and completely shields the welding zone from the atmosphere.

In all circumstances where such submerged arc welding is used, it is necessary to remove the slag from the surface of the weld. This is a problem on small inside diameter welds where the slag cannot be easily removed before the bore makes a full revolution.

It is known that the cladding of confined areas, such as the bore of a part, can be done with other welding processes which are gas shielded rather than flux shielded. Gas shielding produces no slag so welds may be used without having to remove slag. Unfortunately, this cladding is typically carried out by using a very small wire of the type normally used for joining two parts together. If such a small wire were used for the cladding of the interior of pipes, then it would take an extremely long and uneconomical time in which to complete the lining of the pipe. In the past, various patents have issued on strip welding techniques. For example, U.S. Pat. No. 3,272,961, issued on Sep. 13, 1966 to Maier, Jr. describes a method for making ribbed vapor generating tubes. This method includes the steps of disposing a tube on a horizontal axis, positioning a round wire welding electrode within the tube, striking an arc between the electrode and the tube, feeding a metal into the area of the arc, and continuously moving the electrode and the tube relative to each other whereby molten metal is deposited on the inside wall of the tube along a predetermined path.

U.S. Pat. No. 3,274,371, issued on Sep. 20, 1966 to Manz et. al., teaches a process for depositing metal onto a workpiece. This patent describes the use of an inert gas for the shielding of the arc. This is commonly known as a gas tungsten arc weld (GTAW) process. Arc welding is generally classed as either consumable or non-consumable electrode. The GTAW process uses a non-consumable tungsten electrode for the main heat source (i.e. the arc). It does not suggest the use of the filler material as the primary heat source.

U.S. Pat. No. 3,611,541, issued on Oct. 12, 1971 to W. R. Garrett, describes a tool joint rebuilding process. In this process, the outer periphery of a worn down tool joint on the end of a drill pipe is restored to a desired diameter by applying a weld bead to the outer periphery of the tool joint. The joint is rotated and the weld rod periodically translated during the application of the weld material. This is a standard submerged arc (SAW) process using round wires.

U.S. Pat. No. 4,149,060, issued on Apr. 10, 1979 to J. J. Barger, describes a method and apparatus for strip cladding into a corner while magnetically agitating a weld deposit. The clad strip is angled away from a corner in the plane of the electrode strip. The welding head can be positioned so as to clad into the corner without interference from an obstructing pole piece or from the welding head itself. This patent describes strip welding using a standard submerged arc (SAW) welding technique.

U.S. Pat. No. 4,237,362, issued on Dec. 2, 1980 to R. F. Arnoldy, describes a method of producing hard faced plate in which hard facing material is welded to the plate surface so as to cause the plate to shrink against and be supported by the cylindrical surface which effectively maintains the plate against substantial distortion during the welding. This patent describes a gasless version of the gas metal arc (GMA) technique using round wires.

U.S. Pat. No. 4,243,727, issued on Jan. 6, 1981 to Wisler et. al., describes a tool joint hardfacing in which the hardfacing is applied in a single application by rotating the drill pipe, providing an arc between a consumable steel wire and a pipe so as to create a weld puddle, and reciprocating the wire parallel to the pipe axis to create a band. This process is a gas metal arc (GMA) process using round wires.

U.S. Pat. No. 4,518,625, issued on May 21, 1985 to L. J. Westfall, describes arc metal spraying to spray liquid metal onto an array of high strength fibers that have been wound onto a large drum contained inside a controlled atmosphere chamber. The chamber is first evacuated to remove gaseous contaminants and then backfilled with a neutral gas up to atmospheric pressure. This process is an arc spray process which is a metallizing process and not a welding process.

U.S. Pat. No. 4,647,749, issued on Mar. 3, 1987 to P. Koshy, teaches an apparatus and method for weld cladding cylindrical objects. A wire-fed gas-shielded welding torch is supported adjacent to the cylindrical surface of a conduit to be coated such as that of a valve body, weld material being deposited circumferentially around the surface of the conduit. The welding torch includes an oscillating mechanism for providing linear horizontal movement of the welding torch head in the axial direction of the conduit to provide the desired weld bead configuration and characteristics. This is gas metal arc (GMA) welding.

U.S. Pat. No. 5,134,268, issued on Jul. 28, 1992 to T. D. Capitanescu describes a submerged arc welding system which is designed for placing strips of weld material onto the interior surfaces of a pipe. The device includes an elongated casing having a flux inlet and a welding wire feeding device. The flux inlet serves to deliver flux such that the welding tip is submerged in the flux during the welding. This is simply a submerged arc welding process.

It is an object of the present invention to provide a welding process which allows for the application of a corrosion resistant alloy onto the interior surface of a pipe.

It is another object of the present invention to provide a welding system in which a pipe may be internally clad in a time efficient and economically efficient manner.

It is still another object of the present invention to provide a welding system which eliminates the need for flux for the submerging of the welding arc.

It is another object of the present invention to provide a welding system which is easy to use, relatively inexpensive, and easy to manufacture.

These and other objects and advantages of the present invention will become apparent from a reading of the attached specification and appended claims.

SUMMARY OF THE INVENTION

The present invention is a gas shield strip cladding welding system comprising a workpiece, a flat strip of welding material having a width of greater than five millimeters, an enclosure having an opening therein for allowing the strip of welding material to pass therethrough, a feeder for controllably passing the strip of welding material into the enclosure through the opening, a gas delivery system connected to the enclosure for passing a shielding gas into the enclosure adjacent to the strip of material, and a power supply electrically connected to the strip of welding material and to the workpiece such that an arc is produced when the strip of welding material comes into close proximity to the workpiece. The enclosure is placed on a surface of the workpiece and has an open area facing such surface.

In the present invention, a skirt extends downwardly from the enclosure onto the surface of the workpiece so as to retain the gas therein. The opening is positioned approximately centrally of the enclosure.

A movement mechanism is connected to the enclosure for moving the enclosure relative to the workpiece as the strip of material is deposited onto the workpiece.

In the preferred embodiment of the present invention, the workpiece is a pipe. The enclosure is positioned against an interior surface of the pipe. This movement mechanism includes a retracting boom which is connected to the enclosure so as to move the enclosure longitudinally through the pipe. The pipe is supported on a rotation mechanism for rotating the pipe as the retracting boom moves the enclosure longitudinally through the pipe.

In the present invention, the gas delivery system includes a first gas line connected to the enclosure so as to deliver the shield gas to one side of the strip of material and a second gas line connected to the enclosure so as to deliver the shield gas to an opposite side of the strip of material. A trail gas line is connected to the enclosure so as to deliver a trail gas toward an area on the interior of the enclosure rearward of the strip of material. The shield gas includes an inert gas. The trail gas is an inert gas. The feeder includes a set of rollers through which the strip of material passes and a motor connected to the set of rollers. The motor serves to rotate the rollers so as to deliver the strip of material through the opening at a desired rate. The pipe is oriented so as to have a longitudinal axis extending horizontally. The enclosure has an open bottom which faces downwardly toward an inner wall of the pipe.

The present invention is also a method of clad welding a workpiece comprising the steps of: (1) placing an enclosure over a surface of the workpiece such that the enclosure has an open area facing this surface; (2) connecting a power supply to the strip of welding material and to the workpiece; (3) injecting a shield gas into the enclosure; (4) feeding the strip of welding material into the enclosure until an end of the strip of material comes into close proximity to the workpiece so as to cause an electrical arc therebetween; (5) depositing the weld material from the strip so as to clad a portion of the surface of the workpiece; and (6) moving the enclosure relative to the surface of the workpiece so as to deposit the welding material over a desired area.

BRIEF DESCRIPTION OF THE DRAWINGS

FIG. 2 is a side, partially cross sectional, view of the application of the strip clad welding system to the application of a cladding material onto the interior surface of a pipe.

FIG. 3 is an end view of the process shown in FIG. 2.

DETAILED DESCRIPTION OF THE PRESENT INVENTION

Figure 1:
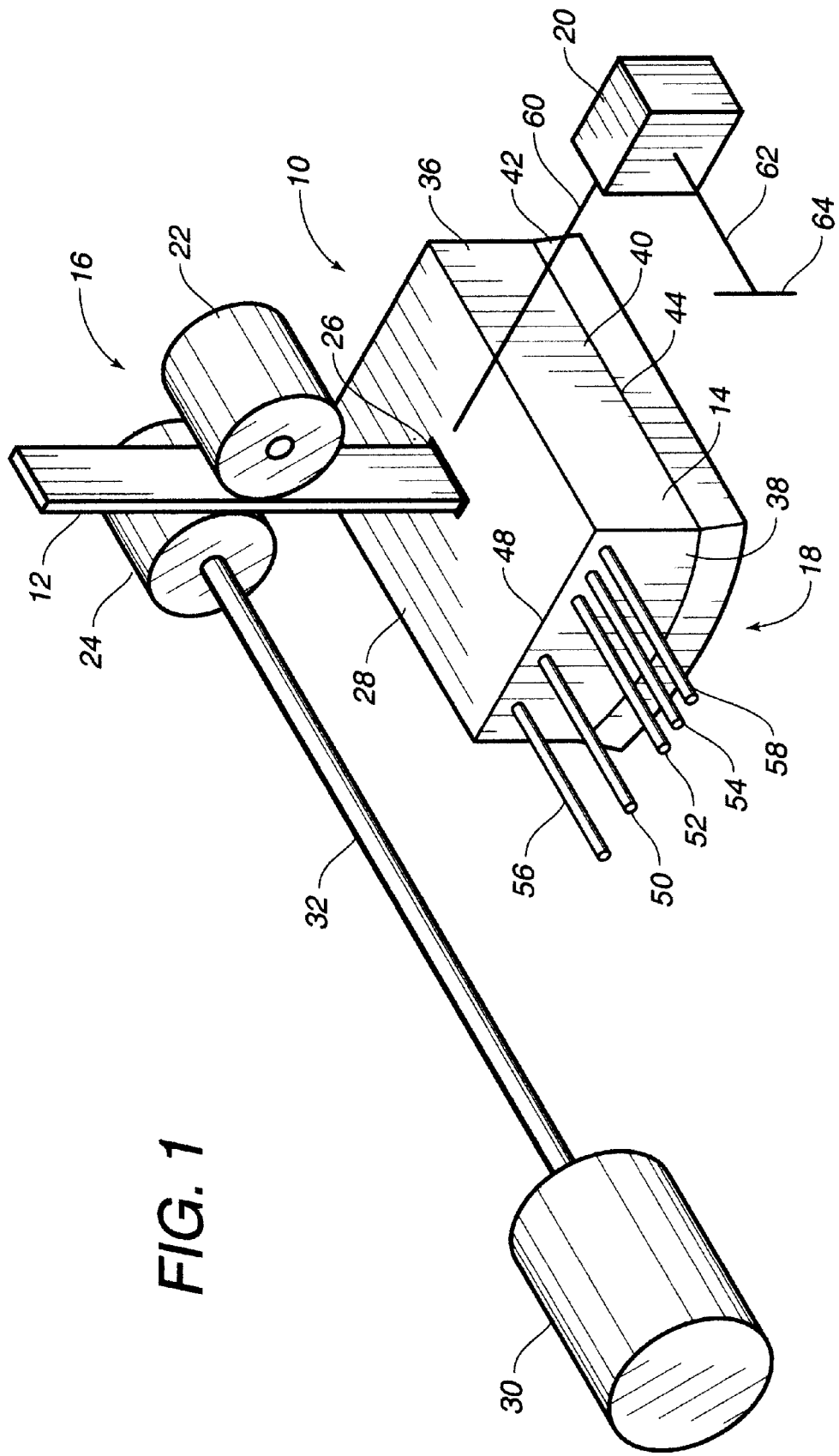
FIG. 1 is a diagrammatic illustration of the strip clad welding system in accordance with the teachings of the present invention.

Referring to FIG. 1, there is shown at 10 the strip cladding welding system in accordance with the preferred embodiment of the present invention. The system 10 includes a strip of welding material 12, an enclosure 14, a feeding mechanism 16, a gas delivery system 18, and power supply 20. Each of these components interacts so as to allow for the application of the strip of welding material 12 onto a workpiece in a gas shielded environment without the use of flux.

The strip of welding material 12 is shown as passing between rollers 22 and 24 and through an opening 26 in the top surface 28 of enclosure 14. The strip of welding material is, in the preferred embodiment of the present invention, INCONEL (TM) material. This INCONEL (TM) material is an alloy of chromium and nickel. As such, this material is very resistive to any corrosion from hydrogen sulfide. The material of strip 12 is extremely desirable as a cladding material for the interior surface of a pipe. The strip 12 will have a generally flat configuration with a width of more than five millimeters. In the preferred form of the present invention, the strip is formed of twentyfive millimeter width INCONEL (TM) 625 material.

The feeding mechanism 16 includes rollers 22 and 24 positioned on opposite sides of the strip 12. Motor 30 includes a shaft 32 connected to roller 24 so as to serve for the driving of the strip 12 in a desired direction into the interior of the enclosure 14 through opening 26. The roller 24 is a power roller while the roller 22, as illustrated, is an idler roller. Various other "means" for delivering the strip 12 into the interior of enclosure 14 are contemplated by the present invention. For example, any system of rollers and motors can be used for such delivery. In other environments, the strip 12 could be mechanically fed into enclosure 14. The system shown in FIG. 1 is but one technique for the delivery of such strip 12 into the enclosure 14.

In FIG. 1, it can be seen that the enclosure 14 is a box having a top surface 28, side surfaces 36 and 38 (the opposite sides not being shown in FIG. 1), and an open bottom 40. The open bottom 40 will rest upon the surface of a workpiece. A skirt 42 formed of a fiberglass tape serves as a "curtain" extending around the bottom edge 44 of the enclosure 14. This skirt 42 will serve to retain the gas and any spatter that may occur within the interior of the enclosure 14. The skirt 42 effectively seals the enclosure 14 against the surface of the workpiece. In an alternative configuration, welds were produced without the fiberglass skirt. In the preferred embodiment of the present invention, the shield is approximately three inches wide, seven inches long and one inch thick. Opening 26 allows for the introduction of the strip 12 into the interior of the enclosure 14. This opening 26 is located generally centrally of the top surface 28 of the enclosure 14. In the preferred embodiment of the present invention, the strip 12 is fed into the interior of the enclosure 14 approximately three inches from the leading edge 48.

So as to allow for the effective "gas shielding" of the strip 12 on the interior of the enclosure 14, shield gas conduits 50 and 52 extend into the enclosure 14 through the wall 38. The gas line 50 allows for the injection of the shield gas on one side of the strip 12 on the interior of the enclosure 14. The second gas line 52 allows for the introduction of the shield gas onto the opposite side of the strip 12 on the interior of the enclosure 14. As can be seen in FIG. 1, the strip 12 extends transversely to the leading edge 48 of the enclosure 14. This arrangement is specifically configured so as to allow the system 10 to apply the strip of material 12 onto the interior surface of a pipe.

A trail gas line 54 also extends through wall 38 into the interior of the enclosure 14. The trail gas line 54 allows for the introduction of gas rearwardly of the strip 12. A coolant line 56 also extends through the wall 38 and around the interior of the enclosure 14 so as to have an exit line 58 exiting through the wall 38. Coolant line 56 serves to cool the surfaces of the walls of the enclosure 14 and to disperse excess heat therefrom. Coolant line 56 will serve as a heat exchanger on the interior of the enclosure 14.

The power supply 20 can be either a DC or an AC power supply. One lead 60 of power supply 20 is electrically connected to the strip 12 on the interior of the enclosure 14. An opposite lead 62 is suitably connected to a workpiece 64. As such, the connection of leads 60 and 62 will cause an arc to be created when the end of the strip 12 is brought into close proximity to the workpiece 64.

In the preferred embodiment of the present invention, it was found that a mix of inert and active gas was suitable for use as the shield gas. An inert gas is introduced behind the weld zone so to act as a trail shield. The results of the use of the present invention were very successful. The best results were obtained from 450 amp 25 volt (cv) 18 i.p.m. 1 and ¼ inch stickout, 70 c.f.h. of 67% Ar, 29% He, 3% $H_2$, 1% $CO_2$ as the shield gas. The best results were obtained with 60 c.f.h. of Ar as the trail gas. This resulted in a globular transfer mode. Cross sections showed a well bonded, clean deposit with minimum penetration.

FIG. 2 shows the application of the process of the present invention as to the coating of the inner wall of a pipe 70. As can be seen in FIG. 2, the pipe 70 is a steel pipe that is supported on support structures 72 and 74. Support structure 72 includes rollers 76 supporting the outer surface of the pipe 70. The support 74 includes a motorized pipe roller 78 which supports the outer surface of the pipe 70. As such, the rollers 76 and 78 will serve to rotate the pipe 70 in a desired direction as the welding system 10 is used for the application of a cladding material 80 onto the inner wall of the pipe 70.

In FIG. 2, it can be seen that the enclosure 14 is connected to a retracting boom 82 by rod 84. As such, the retracting boom 82 will tend to move the housing 14 toward the end 86 of pipe 70 as the pipe 70 is rotated. As such, the cladding 80 is applied consistently and evenly throughout the interior wall of the pipe 70. The strip of welding material 12 is dispensed from a strip reel 88 located at the end of the retracting boom 82. The strip 88 will extend throughout the interior of the pipe 70 so as to enter the enclosure 14 in the manner shown in FIG. 1. Shielding gas line 90 will also extend so as to allow the shielding gas to enter the housing 14 around the strip 12. The roller and feed mechanism is also provided adjacent to the enclosure 14 so as to allow for the introduction of the strip 12 into the interior of the enclosure 14.

In normal use, the strip of welding material will be deposited downwardly onto the bottom surface 92 of the inner wall of pipe 70. The open area of the enclosure 14 will face downwardly toward surface 92. This arrangement is specifically configured so that gravity will tend to urge the liquified welding material into a puddle at the lowermost point of the curved interior of the pipe 70. As such, when the pipe 70 rotates, the welding material will be partially solidified and will not drain toward the bottom 92. As the pipe 70 is rotated, the retracting boom 82 can move the rod 74 rearwardly in a consistent and controlled manner so as to create a spiral shape of the cladding material. Alternatively, the rod 84 can be suitably retracted once each revolution of the pipe so that the cladding 80 is formed in parallel welds with steps between each weld.

FIG. 3 illustrates how the pipe 70 is supported on the motorized rollers 78 and 100. The roller 78 and 100 receive the pipe 70 therebetween. As one of the rollers 78 and 100 is actuated, the pipe 70 will suitably rotate in an opposite direction. The other of the rollers 78 and 100 can be an idler roller which rotates in accordance with the rotation of the pipe 70. It can be seen that the housing 14 faces downwardly to the bottom surface of the inner wall 102 of pipe 70. As such, as the pipe 70 is rotated in one direction, the cladding material will be evenly deposited at the lowermost surface of the inner wall 102 of pipe 70.

Also, in FIG. 3, it can be seen that the support 74 supports the rollers 78 and 100. The support 72 will have a similar configuration to that of support 74.

The present invention is the process of welding by using filler materials in a strip form with gas shielding. The desired application of the process is for the overlaying of INCONEL (TM) and other corrosion resistant alloys onto the interior of a pipe. The use of such gas shielding eliminates the problem of slag buildup associated with submerged arc welding or electroslag welding. As a result of the high rate of the deposit of the cladding material onto the interior of the pipe 70, the present invention achieves a cost effective alternative to the use of INCONEL (TM) pipe. The rate of production associated with the process of the present invention allows the INCONEL (TM) material to be applied in a very cost effective manner. Assurance of the complete cladding of the interior of the pipe can be carried out with known testing methods including fiberoptic inspection. As a result of the process of the present invention, the pipe with the INCONEL (TM) lining can be used in high hydrogen sulfide environments. The possibility of hydrogen embrittlement, and associated catastrophic failure, is minimized through the use of the present invention. The present invention creates a metallurgical bond between the chromium and nickel alloy and the steel surface of the interior of the pipe.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A gas shield strip cladding welding system comprising:
   a work piece;
   a flat strip of welding material having a width of greater than five millimeters;
   an enclosure having an opening therein through which said strip of welding material passes, said enclosure positioned on a surface of said workpiece, said enclosure and said workpiece surrounding a portion of said flat strip of welding material interior of said enclosure;
   a feeder cooperative with said flat strip of welding material so as to controllably pass said flat strip of welding material into said enclosure through said opening;
   a gas delivery means connected to said enclosure, said gas delivery means for passing a shielding gas into said enclosure so as to surround said portion of said flat strip of welding material; and
   a power supply electrically connected to said flat strip of welding material and to said workpiece such that an arc is produced when said flat strip of welding material comes into close proximity to said workpiece.

2. The system of claim 1, further comprising:
   a skirt extending downwardly from said enclosure adjacent the surface of said workpiece.

3. The system of claim 1, said opening being positioned approximately centrally of said enclosure.

4. The system of claim 1, said flat strip of welding material being a corrosion resistant alloy.

5. The system of claim 1, further comprising:
   a travel means connected to said enclosure for moving said enclosure relative to said workpiece as the flat strip of welding material is deposited on said workpiece.

6. The system of claim 5, said workpiece being a pipe, said enclosure positioned against an interior surface of said pipe, said travel means comprising:
   a retracting boom connected to said enclosure so as to move said enclosure longitudinally through said pipe.

7. The system of claim 6, further comprising:
   rotation means connected to said pipe for rotating said pipe as said retracting boom moves said housing longitudinally through said pipe.

8. The system of claim 1, said gas delivery means comprising:
   a gas line connected to said enclosure so as to deliver the shield gas around said flat strip of welding material.

9. The system of claim 8, said gas delivery means further comprising:
   a trail gas line connected to said enclosure so as to deliver a trail gas toward an area on the interior of said enclosure rearward of said flat strip of welding material.

10. The system of claim 9, said shield gas and said trail gas including an inert gas.

11. The system of claim 1, said feeder comprising:
    a set of rollers through which said flat strip of welding material passes; and
    a motor means connected to said set of rollers, said motor means for rotating said set of rollers so as to deliver said flat strip of welding material through said opening at a desired rate.

12. The system of claim 7, said pipe being oriented so as to have a longitudinal axis extending horizontally, said enclosure having an open bottom facing downwardly toward an inner wall of said pipe.

* * * * *